Nov. 2, 1948.  H. BARNARD  2,452,714
PISTON
Filed April 7, 1945

HAROLD BARNARD
INVENTOR.

BY *Lester B. Clark*
  *Ray L. Smith*

ATTORNEYS.

Patented Nov. 2, 1948

2,452,714

UNITED STATES PATENT OFFICE 2,452,714

PISTON

Harold Barnard, Houston, Tex., assignor to The Whitehead Bros. Rubber Company, a corporation of New Jersey Application April 7, 1945, Serial No. 587,059

6 Claims. (Cl. 309—23)

This invention relates to pump pistons and particularly to a piston of the type that is capable of providing the service required in slush pumps which are used in the circulation of drilling fluids in the rotary method of well drilling.

As is well known, slush pumps that are used in the rotary method of drilling wells, utilize pistons which are secured to piston rods for reciprocation in pump cylinders which are provided with valves at opposite ends so that the piston has a working stroke in each direction. Enormous pressures are exerted upon these pistons which are in constant contact with abrasive fluids, and it is therefore necessary that the piston be of rugged construction, and that it be so designed that the effect of destructive forces acting hereon are minimized. It is also desirable that ready repair and/or replacement of the piston, or parts thereof, be possible.

It is the primary object of the invention to provide a piston which is simple, is of sturdy construction, and which is so designed that replacements and repair may be readily effected.

Another object is to provide a piston having a plurality of packing rings of identical construction.

Another object is to provide a piston having expansible packing rings and cooperating means for admitting fluid pressure to the rings from the respective ends of the piston.

A still further object is to provide a piston having telescopic body members which cooperate with an interposed flange to form packing receiving grooves about the piston.

It is also an object of the invention to provide a piston packing ring of improved construction.

The foregoing objects, together with other objects and advantages of the invention, will be more fully apparent from the following description considered in connection with the accompanying drawings in which.

Figure 2:
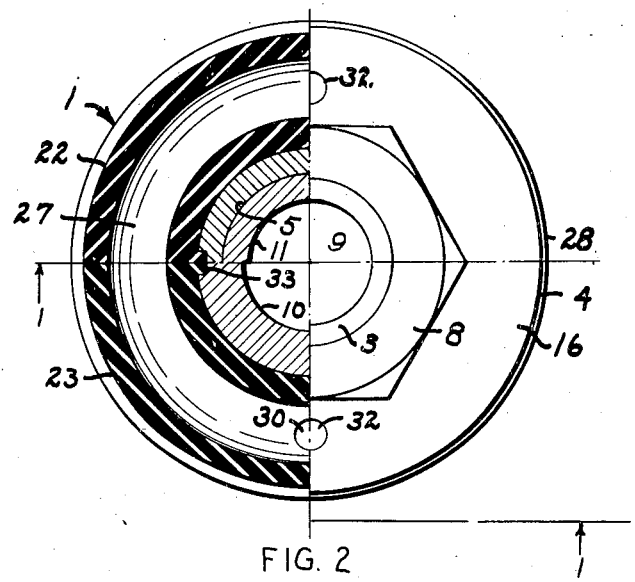
Fig. 2 is a plan view of the piston shown in Fig. 1, the view being partly in section. The upper and lower quadrants shown in section are respectively taken on lines 2—2 and 3—3 in Fig. 1.

The piston I embodying the invention includes a body 2 comprising telescopic members 3 and 4, of which the former is reduced at 5 to receive the latter, and also to receive the interposed flange 6. The end of the reduced portion 5 of the member 3 is threaded at 7 to receive the nut 8 whereby the component parts of the piston are releasably held in assembled relation.

Members 3 and 4 have flanges 15 and 16 at their outer ends to cooperate with the flange 6 and with the surfaces 20 and 21 on these members to provide spaced annular grooves about the piston assembly to receive the packing rings 22 and 23. It is to be noted that the side walls of the respective flanges are tapered so that the side walls of the grooves extend convergingly outwardly, and also that these walls merge into the peripheral cylindrical surfaces of the flanges in the arcuate surface 25. These features of construction aid in directive flow of material of the packing rings to maintain a seal and to compensate for wear, as will more fully appear hereinafter.

The body member 3 has a central bore 9 having tapered wall 10 of which the cylindrical wall 11 at the upper end of the piston forms a continuation. The bore 9 is of a size and configuration to receive the end of a piston rod to which the piston is attached for normal use within a pump cylinder.

The rings 22 and 23 are of a special construction for cooperation with the piston thus far described. These rings are made of any suitable material which is resilient, but relatively noncompressible. The inner and side walls of the rings are complementary to, and engaged by the bottoms and side walls of the piston structure, and have outwardly tapered peripheral edges 26 forming lips 28 which assist in forming the desired seal to prevent the flow of drilling fluid between the piston and the cylinder wall within which the piston is used.

Figure 1:
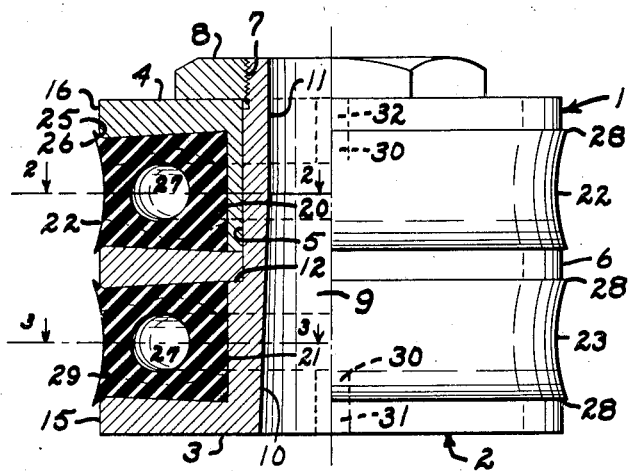
Fig. 1 is a sectional view through a piston embodying the invention, the view being taken on line I—I in Fig. 2.

The packing rings 22 and 23 have toroidal chambers 27 therein and, as will be fully explained, means is provided to admit pressure fluids to these chambers. Since the material of the rings 22 and 23 is resilient but noncompressible, and since the rings are restrained for movement in the direction of the walls of the packing spaces, the application of pressure within the chambers 27 is instrumental in producing such radial displacement or flow of the ring material that the peripheral surfaces thereof are maintained in intimate engagement with the walls of the surrounding cylinder. To desirably control the lines of flow of the packing material and to thus enhance the life of the packing rings, one or more layers of fabric 29, shown by dotted lines in Fig. 1, are embedded within the material of the rings 22 and 23, such fabric extending radially from the inner to the outer surfaces of the rings and passing the chamber 27 at opposite sides thereof.

The packing rings are provided with side openings 30 in their outer faces and these openings are in mating relation with the openings 31 and 32 in the respective end flanges. To assure this mating relation of the openings in the flanges and the rings, one or more axially extending grooves 33 are provided in each of the surfaces 20 and 21 to receive complementary key-like projections on the inner surface of the packing rings 22 and 23.

It seems apparent that this construction assures that pressure exerted upon the ends of the piston is transmitted through the openings 30, 31 and 32 to the chamber 27 within the respective packing rings. It also seems apparent that the grooves 33 are so oriented that the rings 22 and 23 are interchangeable.

The structure, advantages, and the mode of operation of the piston as above described are believed apparent. By way of amplification and reiteration, it will be pointed out that the piston is assembled by first placing the packing ring 23 upon the surface 21 in a manner that the passages 30 and 31 are in alignment, the inward projection on the packing ring fitting within the groove 33. Flange 6 is then placed in engagement with the side wall of the ring 23 and the shoulder 12 on the member 3. The ring 22 is then placed upon the telescoping body member 4 with the openings 30 and 32 of the ring and member in alignment. This assembly is then positioned upon the reduced portion 5 of the member 3 and the complete assembly is secured in a unitary structure by means of the nut 8.

Dismantling of the piston for replacement of parts, or repair thereof, is believed apparent, it being pointed out that the component parts of the piston are so designed and constructed that repair may be readily effected, or that, where desired, replacement of parts is facilitated.

Broadly the invention comprehends a slush pump piston which is simple, and effective, and which is inexpensive to construct and maintain.

What is claimed is:

1. A piston including telescopic body sections having flanged outer ends, a flange interposed and clamped between said body sections whereby annular spaces are provided to receive packing rings about the periphery of the piston assembly, the opposed faces in said spaces tapering convergingly outward, and a packing ring in each of said spaces.

2. A piston including telescopic body sections having flanged outer ends, a flange interposed and clamped between said body sections whereby annular spaces are provided to receive packing rings about the periphery of the piston assembly, the opposed faces in said spaces tapering convergingly outward, a packing ring in each of said spaces, and a chamber in each of said rings, there being a passage for pressure fluid from each end of the piston to the adjacent packing ring.

3. A piston including a body assembly having end flanges and an intermediate flange forming annular peripheral spaces, a packing ring in each of said spaces, an annular pressure chamber in each of said rings, and means for admitting pressure fluid from the end of the piston to the chamber within the adjacent packing ring.

4. A piston comprising telescopic body members having end flanges and axially extending cylindrical surfaces thereon, a flange interposed between said members and forming, with said cylindrical surfaces, a pair of packing receiving spaces, a chambered packing ring within each of said spaces, and means for restraining each of said rings from rotation relative to its associated member, there being passages from each end of the piston to the chamber within the adjacent packing ring.

5. A piston including an assembly comprising a body having end flanges and an intermediate flange forming packing receiving grooves about the assembly, the opposed flange faces in each of said grooves being tapered convergingly outwardly and merging with the periphery of the flanges in a curved surface, and a packing ring filling each of said grooves, said packing ring having flared peripheral edges overlying said curved surface to provide annular seal lips about the piston.

6. A piston including an assembly comprising a body having end flanges and an intermediate flange forming packing receiving grooves about the assembly, the opposed flange faces in each of said grooves being tapered convergingly outwardly and merging with the periphery of the flanges in a curved surface, a packing ring filling each of said grooves, said packing ring having flared peripheral edges overlying said curved surface to provide annular seal lips about the piston, and means responsive to fluid pressure upon said piston for expanding the packing rings radially of the assembly.

HAROLD BARNARD.

REFERENCES CITED

The following references are of record in the file of this patent:

UNITED STATES PATENTS

| Number | Name | Date |
| --- | --- | --- |
| 1,145,733 | Wright | July 6, 1915 |
| 1,274,783 | Renard | Aug. 6, 1918 |
| 1,481,160 | Switzer | Jan. 15, 1924 |
| 1,622,043 | Miller | Mar. 22, 1927 |
| 1,678,365 | Sutliff | July 24, 1928 |
| 1,740,831 | McMahon | Dec. 24, 1929 |
| 1,820,228 | Kibele | Aug. 25, 1931 |

FOREIGN PATENTS

| Number | Country | Date |
| --- | --- | --- |
| 520,237 | Great Britain | 1940 |